US012162023B2

(12) United States Patent
Lumsden

(10) Patent No.: US 12,162,023 B2
(45) Date of Patent: Dec. 10, 2024

(54) APPARATUS AND PROCESS FOR IMPROVED ORE RECOVERY

(71) Applicant: AUSMETEC PTY LTD., Cromer (AU)

(72) Inventor: Barry Graham Lumsden, Clontarf (AU)

(73) Assignee: AUSMETEC PTY LTD. (AU)

( * ) Notice: Subject to any disclaimer, the term of this patent is extended or adjusted under 35 U.S.C. 154(b) by 155 days.

(21) Appl. No.: 17/263,998

(22) PCT Filed: Jul. 30, 2019

(86) PCT No.: PCT/AU2019/050800
§ 371 (c)(1),
(2) Date: Jan. 28, 2021

(87) PCT Pub. No.: WO2020/024008
PCT Pub. Date: Feb. 6, 2020

(65) Prior Publication Data
US 2021/0316314 A1 Oct. 14, 2021

(30) Foreign Application Priority Data

Jul. 30, 2018 (AU) ................................ 2018902763
Dec. 19, 2018 (AU) ................................ 2018904830

(51) Int. Cl.
*B03C 1/033* (2006.01)
*B03C 1/02* (2006.01)
(Continued)

(52) U.S. Cl.
CPC ............ *B03C 1/0332* (2013.01); *B03C 1/286* (2013.01); *B03C 1/30* (2013.01); *B03D 1/02* (2013.01); *B03C 2201/18* (2013.01)

(58) Field of Classification Search
CPC ......... B03C 1/30; B03C 2201/18; B03D 1/04; B03D 1/085
(Continued)

(56) References Cited

U.S. PATENT DOCUMENTS

2004/0134849 A1 7/2004 Lumsden et al.
2013/0037490 A1 2/2013 Lumsden
(Continued)

FOREIGN PATENT DOCUMENTS

CN 105214837 A 6/2017
CN 104722393 A 11/2017
(Continued)

OTHER PUBLICATIONS

Ahmed, N and Jameson, G, 1989. Flotation kinetics, Mineral Processing and Extractive Metallurgy Review, 50:77-99.
(Continued)

*Primary Examiner* — Michael McCullough
*Assistant Examiner* — Molly K Devine
(74) *Attorney, Agent, or Firm* — Hayes Soloway PC

(57) ABSTRACT

In a flotation recovery circuit which includes the steps of: a grinding stage wherein a predetermined quantity of ore is ground to a predetermined size while irrigating the ore with water including recovered process water thereby to form a ground ore portion; conveying the ground ore portion mixed with the recovered process water to a flotation recovery stage; applying flotation recovery to the ground ore portion thereby to extract a recovered metal portion from a mix of the recovered process water and the ground ore portion; returning at least a portion of the recovered process water to the grinding stage; a method of increasing recovery of the metal portion from the predetermined quantity of ore; the method comprising applying a magnetic field to the ground ore portion in a magnetic conditioning stage while it is
(Continued)

contained in the recovered process water subsequent to the grinding stage.

20 Claims, 10 Drawing Sheets

(51) Int. Cl.

| | |
|---|---|
| ***B03C 1/025*** | (2006.01) |
| ***B03C 1/031*** | (2006.01) |
| ***B03C 1/28*** | (2006.01) |
| ***B03C 1/30*** | (2006.01) |
| ***B03D 1/00*** | (2006.01) |
| ***B03D 1/02*** | (2006.01) |

(58) Field of Classification Search
USPC ............................................................ 209/39
See application file for complete search history.

(56) References Cited

U.S. PATENT DOCUMENTS

| | | | | |
|---|---|---|---|---|
| 2016/0310956 | A1* | 10/2016 | Filmer | C22B 15/0002 |
| 2016/0332916 | A1* | 11/2016 | Ancia | B03C 1/025 |
| 2022/0055039 | A1* | 2/2022 | Jansson | C02F 9/00 |

FOREIGN PATENT DOCUMENTS

| | | | | |
|---|---|---|---|---|
| JP | 2017196543 A | 11/2017 | | |
| WO | WO-2017049259 A1 * | 3/2017 | | B02C 23/12 |

OTHER PUBLICATIONS

Engelhardt, D, Ellis, K and Lumsden, B, 2005. Improving fine sulphide mineral recovery—Plant evaluation of a new technology, in Proceedings Centenary of Flotation Symposium, pp. 829-834 (The Australasian Institute of Mining and Metallurgy: Melbourne).

Holloway, B, Clarke, G, and Lumsden, B, 2008, Improving fine lead and Ag flotation recovery at BHP-Billiton's Cannington mine, Paper presented at the 40th Canadian Mineral Processors Conference, Ottawa, Jan. 2008.

Lacouture, B, Wilson, B, Oliver, J, and Lumsden, B, 2016, Improving fine sulphideμ mineral recovery at the Red Dog operation, paper presented to XXVIII International Mineral Processing Congress (IMPC), Quebec City, Sep. 11-15.

Musuku, B, Muzinda, I, and Lumsden, B, (2015). Cu—Ni processing improvements at First Quantum's Kevitsa mine, Min Eng, 88: pp. 9-17.

Napier-Munn, T, 2010. Designing and analysing plant trials, in Flotation Plant Optimization: (ed: C Greet), pp. 175-190 (The Australian Institute of Mining and Metallurgy: Melbourne).

Thompson,M, 2016. Concentrate Thickeners Feed Well Replacement, in Proceedings of the 13th Mill Operators' Conference, pp. 273-278 (The Australasian Institute of Mining and Metallurgy: Melbourne).

Rivett, T, Wood, G and Lumsden, B, 2007. Improving fine Cu and gold flotation recovery—a plant evaluation, in Proceedings of the Ninth Mill Operators' Conference, pp. 223-228 (The Australasian Institute of Mining and Metallurgy: Melbourne).

Svoboda, Jan, and Jan Źofka. "Magnetic flocculation in secondary minimum." Journal of Colloid and Interface Science 94.1 (1983): 37-44.

Wilding, J and Lumsden, B, 2011. Implementation of magnetic conditioning in two stage sequential Cu—Zn flotation separation, in Proceedings of the Conference of Metallurgists, pp. 139-148 (Metallurgy and Materials Society: Quebec).

Zoetbrood, D, Vass, P and Lumsden, B, 2010. Magnetic conditioning of pentlandite flotation—plant evaluation, paper presented at Processing of Nickel Ores and Concentrates, Falmouth, Jun. 2010.

* cited by examiner

Mineral recovery by flotation for different sulphide particle sizes (Ahmed et al. 1989)

A generalised description of the total energy of interaction for paramagnetic ultrafine particles as a function of particle size (*a*) and magnetic induction B (Svoboda, 1987)

The effect of equipment sizing on using wiper magnetising

Slurry Magnetising Equipment

Wiper Cleaning System

APPARATUS AND PROCESS FOR IMPROVED ORE RECOVERY

TECHNICAL FIELD

The present invention relates to apparatus and process for improved ore recovery and more particularly to an apparatus and process which improves the recovery from mineral fines.

BACKGROUND

In the separation of valuable minerals from an ore, whether by flotation separation or gravity separation or some other method, it has been found that fine minerals, those less than 20 μm are the hardest to recover—refer FIG. 1 which illustrates mineral recovery by flotation for different sulphide particle sizes (Ahmed et al. 1989).

Primarily, the sulphide minerals of base metals are recovered by flotation. These <20 μm minerals are valuable and increased recovery of these minerals significantly enhances the profitability of these operations.

Recent research has shown that magnetic conditioning of flotation feed increases the recovery of these <20 μm minerals (Englehardt et al 2005, Holloway et al 2008, Lacouture et al 2016, Wilding and Lumsden 2011, Musuku et al 2015, Rivett et al 2007, Zoetbrood et al 2010). This technology was patented in 2001 (U.S. Pat. No. 7,429,331) and has been installed in many plants throughout the world.

In a typical plant operation the mined ore is ground in a ball mill, sag mill and/or fine grinding mill to produce small minerals where the valuable minerals can be separated from the ore by flotation. As existing ores are depleted mining companies are forced to process more complex ores of lower grade. Also, the economics and technology for fine grinding technology is improving so the combination of these two factors leads to finer grinding in flotation plants to optimize the separation of valuable minerals from the ore.

However, very fine minerals are harder to recover. Moreover, even detecting these very fine minerals in plant flowstreams is more difficult. Plants collect flowstream samples from their process streams to measure the performance of their plant. However, the standard filter paper in use has a 8-10 μm pore size. Therefore, it is probable that some <8 μm mineral in process flowstreams is passing through the filter paper undetected, not being recovered in the filter cake so not being detected in the plant flowstreams. Obviously a magnetic aggregation technology that aggregates fine minerals would aggregate some of the <8 μm minerals to >8 μm and therefore they are filtered and detected in the plant flowstreams.

Mineral processing plants also have other separation processes downstream of flotation that may be inefficient in removing <8 μm mineral from the process. In particular there are dewatering processes—the settling (or thickening) then filtration of the flotation concentrate and the thickening of the flotation tailings. The water recovered from these dewatering processes report back to the grinding circuit or other parts of the process upstream of the flotation. These dewatering processes are not 100% efficient so the process water does retain some of the finer mineral. Filter cloth manufacturers claim only 95% recovery of <4 μm minerals when concentrate is being filtered.

Magnetic conditioning has been in use in plants for many years. There is a relationship between magnetic field strength and the size of particle that can be aggregated. This can be seen in FIG. 2 from Svoboda, 1983. As magnetic field strength (B) increases smaller paramagnetic particles can be aggregated.

The diagram also makes clear that at fields of 3000 gauss (3×10-1T) even very small <2 μm paramagnetic particles with similar magnetic susceptibility to haematite would aggregate. So the aggregation of a 10 μm particle with a <2 μm particle would be assured. There is no necessity of stronger fields for this size particle aggregation of similar magnetic susceptibility (many base metal sulphides have similar magnetic susceptibility to haematite). Of course this is a theoretical graph based on some reasonable assumptions including about particles shape, particle homogeneity but nevertheless they give a reasonable indication of paramagnetic particle interaction.

FIG. 2 depicts a generalised description of the total energy of interaction for paramagnetic ultrafine particles as a function of particle size (a) and magnetic induction B (Svoboda, 1983).

Notwithstanding the issues involved in extracting the very fine mineral portions in plant flowstreams it is desirable to improve the proportion of recovery of the fine portion—particularly as ore bodies of lesser quality are processed. It would also be desirable to reprocess tailings of previously processed ore bodies.

It is an object of the present invention to address the above issues or at least provide a useful alternative.

Notes

The term “comprising” (and grammatical variations thereof) is used in this specification in the inclusive sense of “having” or “including”, and not in the exclusive sense of “consisting only of”.

The above discussion of the prior art in the Background of the invention, is not an admission that any information discussed therein is citable prior art or part of the common general knowledge of persons skilled in the art in any country.

SUMMARY OF INVENTION

Definitions

Fine Mineral: In this specification “fine mineral” means ore particles after grinding or other processing step in the size range predominantly between zero and substantially 38 μm and more preferably between zero and substantially 25 μm.

Accordingly in one broad form of the invention there is provided a flotation recovery circuit which comprises a grinding stage, a flotation recovery stage, a dewatering stage and a filter stage and which effects the steps of:

- grinding a predetermined quantity of ore in the grinding stage is ground to a predetermined size while irrigating the ore with water including recovered process water thereby to form a ground ore portion;
- conveying the ground ore portion mixed with the recovered process water to the flotation recovery stage;
- the recovered process water recovered after the flotation recovery stage from the dewatering stage or the filter stage;
- applying flotation recovery via the flotation stage to the ground ore portion thereby to extract a recovered metal portion from a mix of the recovered process water and the ground ore portion;
- returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss.

Accordingly in one broad form of the invention there is provided a flotation recovery circuit which comprises a grinding stage, a flotation recovery stage, a dewatering stage and a filter stage and which effects the steps of:

grinding a predetermined quantity of ore in the grinding stage is ground to a predetermined size while irrigating the ore with water including recovered process water thereby to form a ground ore portion;

conveying the ground ore portion mixed with the recovered process water to the flotation recovery stage;

the recovered process water recovered after the flotation recovery stage from the dewatering stage or the filter stage;

applying flotation recovery via the flotation stage to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage.

Accordingly in another broad form of the invention there is provided a flotation recovery circuit which includes the steps of a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; the method improving recovery of the desired paramagnetic minerals by aggregation of the para-magnetic minerals thereby to improve recovery from the downstream water-mineral separation processes (And thereby excluded from the recovered process water).

Accordingly in another broad form of the invention there is provided a flotation recovery circuit which includes the steps of a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; and wherein valuable paramagnetic minerals in the recovered process water portion are detected and re-recovered in the floatation stage (because they are aggregated and so recoverable both in the plant detection system and also in the flotation process.

Accordingly in another broad form of the invention there is provided a method of increasing the efficiency of separation of a desired material having weakly magnetic properties and being contained in a flowstream; said material including paramagnetic particles of less than substantially 38 micron size; said method comprising aggregating said paramagnetic particles of less than 38 micron size to greater size in order to reduce their tendency to be entrained in flotation froth.

Accordingly in another broad form of the invention there is provided an apparatus for inducing magnetism in a flowstream of an at least partially magnetisable particulate feed material suspended in a liquid, in use to precondition the flowstream for a subsequent separation process in a separate stage, the apparatus including:

a treatment chamber having an inlet and an outlet through which the flowstream respectively enters and exits the chamber; and a magnetic source within the treatment chamber, the magnetic source that when it removes the magnetiseable material the material remains in the flowstream and is not removed where the magnetic source has a magnetic field strength of greater than 4500 gauss.

Accordingly in another broad form of the invention there is provided an apparatus for inducing magnetism in a flowstream of an at least partially magnetisable particulate feed material suspended in a liquid, in use to precondition the flowstream for a subsequent separation process in a separate stage, the apparatus including:

a treatment chamber having an inlet and an outlet through which the flowstream respectively enters and exits the chamber; and a magnetic source within the treatment chamber, the magnetic source that when it removes the magnetiseable material the material remains in the flowstream and is not removed;

where the magnetic source has a magnetic field strength of greater than 4500 gauss;

where the magnetic conditioning affects the UPSTREAM mineral content in the feed upstream of the treatment chamber.

Accordingly in another broad form of the invention there is provided an apparatus for inducing magnetism in a flowstream of an at least partially magnetisable particulate feed material suspended in a liquid, the apparatus including:

a treatment chamber having an inlet and an outlet through which the flowstream respectively enters and exits the chamber; and a magnetic source able to be selectively activated with respect to the treatment chamber, such that, when activated, the magnetic source induces magnetism in at least some of the particulate feed material located in the chamber.

Accordingly in another broad form of the invention there is provided an apparatus for magnetising a portion of a feed material, the portion including material fractions having a range of magnetic susceptibilities, the apparatus operable to induce magnetism in the portion so as to facilitate the subsequent separation of a more weakly magnetic feed material fraction from a more strongly magnetic feed material fraction.

Accordingly in another broad form of the invention there is s provided a process for inducing magnetism in a flowstream of an at least partially magnetisable particulate feed material suspended in a liquid involving the steps of:

passing the flowstream through a treatment chamber; and selectively activating a magnetic source with respect to the treatment chamber, such that, when activated, the magnetic source induces magnetism in at least some of the particulate feed material located in the chamber.

Accordingly in another broad form of the invention there is provided a process for magnetising a portion of a feed material, the portion including material fractions having a range of magnetic susceptibilities, the process operable to induce magnetism in the portion so as to facilitate the subsequent separation of a more weakly magnetic feed material fraction from a more strongly magnetic feed material fraction.

Accordingly in another broad form of the invention there is provided an apparatus for inducing magnetism in a flowstream of an at least partially magnetisable particulate feed material suspended in a liquid, in use to condition the flowstream to enhance the subsequent separation process, the apparatus including:

a treatment chamber having an inlet and an outlet through which the flowstream respectively enters and exits the chamber; and a magnetic source within the treatment chamber, said magnetic source substantially continuously immersed in and activated with respect to the flowstream.

Accordingly in another broad form of the invention there is provided An apparatus for magnetizing a portion of a feed material, the apparatus including:

a treatment chamber having an inlet and an outlet through which the flowstream respectively enters and exits the chamber; and a magnetic source within the treatment chamber;

wherein the magnetic source has magnetic material cleaned/removed from it without the material exiting the flowstream or the magnetic source being de-activated thereby to continuously magnetize the flowstream.

Accordingly in another broad form of the invention there is provided an apparatus for inducing magnetism in a flowstream of an at least partially magnetisable particulate feed material suspended in a liquid, the apparatus including:

a treatment chamber having an inlet and an outlet through which the flowstream respectively enters and exits the chamber; and a magnetic source within the treatment chamber;

and wherein the magnetic source remains in the treatment chamber and is permanently activated.

Accordingly in another broad form of the invention there is provided a process for magnetizing a portion of a feed material, the portion including material fractions having a range of magnetic susceptibilities, the process including the steps of passing the feed through a treatment chamber containing a magnetic source to induce magnetism in the portion so as to enhance the subsequent separation of a more weakly magnetic feed material fraction from a more strongly magnetic feed material fraction and a least magnetic feed material fraction.

Accordingly in another broad form of the invention there is provided a flotation recovery circuit which includes the steps of a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 3000 gauss whereby a change is caused in the concentration of magnetised paramagnetic particles in the portion of the recovered process water returned to the grinding stage.

Accordingly in another broad form of the invention there is a flotation recovery circuit which includes the steps of a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 3000 Gauss whereby a change is caused in the concentration of magnetised paramagnetic particles in the portion of the recovered process water returned to the grinding stage such that there is an increased recovery of the metal portion from the predetermined quantity of ore from the flotation recovery process.

Accordingly in another broad form of the invention there is provided a flotation recovery circuit which includes the steps of:

a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss.

Preferably the magnetic field strength applied to the ground ore portion in the magnetic conditioning stage is in the range 4500 Gauss to 10000 Gauss.

Preferably the magnetic field strength applied to the ground ore portion in the magnetic conditioning stage is in the range 5000 Gauss to 10000 Gauss.

Preferably the magnetic field strength applied to the ground ore portion in the magnetic conditioning stage is in the range 6000 Gauss to 12000 Gauss.

Preferably the at least a portion of the recovered process water is returned to the grinding stage as output from a water-mineral separation process.

Preferably the water-mineral separation process comprises filtration or thickening.

Preferably the water-mineral separation process is located downstream of the flotation recovery stage and the magnetic conditioning stage:

Accordingly in a further broad form of the invention there is provided a flotation recovery circuit which includes the steps of a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; the method improving recovery of the desired paramagnetic minerals by aggregation of the para-magnetic minerals thereby to improve recovery from the downstream water-mineral separation processes (And thereby excluded from the recovered process water)

Preferably the magnetic field strength applied to the ground ore portion in the magnetic conditioning stage is in the range 4500 Gauss to 10000 Gauss.

Preferably the magnetic field strength applied to the ground ore portion in the magnetic conditioning stage is in the range 5000 Gauss to 10000 Gauss.

Preferably the magnetic field strength applied to the ground ore portion in the magnetic conditioning stage is in the range 6000 Gauss to 12000 Gauss.

Preferably the at least a portion of the recovered process water is returned to the grinding stage as output from a water-mineral separation process.

Preferably the water-mineral separation process comprises filtration or thickening.

Preferably the water-mineral separation process is located downstream of the flotation recovery stage and the magnetic conditioning stage Accordingly in a further broad form of the invention there is provided in a flotation recovery circuit which includes the steps of:

a grinding stage wherein a predetermined quantity of ore is ground to a predetermined size while irrigating the ore with water including recovered process water thereby to form a ground ore portion;

conveying the ground ore portion mixed with the recovered process water to a flotation recovery stage;

applying flotation recovery to the ground ore portion thereby to extract a recovered metal portion from a mix of the recovered process water and the ground ore portion;

returning at least a portion of the recovered process water to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; and wherein valuable paramagnetic minerals in the recovered process water portion are detected and re-recovered in the floatation stage (because they are aggregated and so recoverable both in the plant detection system and also in the flotation process.

Preferably the magnetic field strength applied to the ground ore portion in the magnetic conditioning stage is in the range 4500 Gauss to 10000 Gauss.

Preferably the magnetic field strength applied to the ground ore portion in the magnetic conditioning stage is in the range 5000 Gauss to 10000 Gauss.

Preferably the magnetic field strength applied to the ground ore portion in the magnetic conditioning stage is in the range 6000 Gauss to 12000 Gauss.

Preferably the at least a portion of the recovered process water is returned to the grinding stage as output from a water-mineral separation process.

Preferably the water-mineral separation process comprises filtration or thickening.

Preferably the water-mineral separation process is located downstream of the flotation recovery stage and the magnetic conditioning stage.

In yet a further broad form of the invention there is provided a method of increasing the efficiency of separation of a desired material having weakly magnetic properties and being contained in a flowstream; said material including paramagnetic particles of less than substantially 38 micron size; said method comprising aggregating said paramagnetic particles of less than 38 micron size to greater size in order to reduce their tendency to be entrained in flotation froth.

Preferably once aggregated if it is a desired aggregated particle it will float as part of a floatation separation process or if it is not a desired aggregated particle it can be expected to be rejected from being entrained in the flotation concentrate and be available for harvesting in a separate stage which targets the aggregated particle as a desired aggregated particle.

In yet a further broad form of the invention there is provided an apparatus for inducing magnetism in a flowstream of an at least partially magnetisable particulate feed material suspended in a liquid, in use to precondition the flowstream for a subsequent separation process in a separate stage, the apparatus including:

- a treatment chamber having an inlet and an outlet through which the flowstream respectively enters and exits the chamber; and
- a magnetic source within the treatment chamber, the magnetic source that when it removes the magnetiseable material the material remains in the flowstream and is not removed
- where the magnetic source has a magnetic field strength of greater than 4000 gauss.

In yet a further broad form of the invention there is provided an apparatus for inducing magnetism in a flowstream of an at least partially magnetisable particulate feed material suspended in a liquid, in use to precondition the flowstream for a subsequent separation process in a separate stage, the apparatus including:

- a treatment chamber having an inlet and an outlet through which the flowstream respectively enters and exits the chamber; and
- a magnetic source within the treatment chamber, the magnetic source that when it removes the magnetiseable material the material remains in the flowstream and is not removed
- where the magnetic source has a magnetic field strength of greater than 4000 gauss
- where the magnetic conditioning affects the UPSTREAM mineral content in the feed.

In yet a further broad form of the invention there is provided an apparatus for inducing magnetism in a flowstream of an at least partially magnetisable particulate feed material suspended in a liquid, the apparatus including: a treatment chamber having an inlet and an outlet through which the flowstream respectively enters and exits the chamber; and

- a magnetic source able to be selectively activated with respect to the treatment chamber, such that, when activated, the magnetic source induces magnetism in at least some of the particulate feed material located in the chamber.

Preferably activation of the magnetic source involves moving that source into and out of proximity with the chamber.

Preferably the magnetic source is mounted on a motive means which causes the magnetic source to reciprocatingly move into and out of proximity with the treatment chamber.

Preferably the motive means is a piston.

Preferably the treatment chamber is annularly shaped, having an internal elongate recess into which the magnetic source is reciprocatingly receivable.

Preferably the treatment chamber has a fluid inlet through which a fluid is able to be introduced into the liquid to aid suspension of particulate feed material in that liquid.

Preferably the preceding claims wherein the feed material includes paramagnetic and ferromagnetic particulates.

Preferably the paramagnetic particulates include at least one sulfide mineral containing copper, zinc or another transition metal.

Preferably the paramagnetic particulates include at least one of the group including sphalerite contaminated with iron, arsenopyrite, cassiterite, chalcopyrite, platinum metal and palladium metal.

In yet a further broad form of the invention there is provided an apparatus for magnetising a portion of a feed material, the portion including material fractions having a range of magnetic susceptibilities, the apparatus operable to induce magnetism in the portion so as to facilitate the subsequent separation of a more weakly magnetic feed material fraction from a more strongly magnetic feed material fraction.

Preferably the more weakly magnetic feed material fraction includes mainly paramagnetic particulates and the more strongly magnetic feed material fraction includes mainly ferromagnetic particulates.

Preferably the magnetic source is selectively activatable with respect to the treatment chamber.

In yet a further broad form there is provided a process for inducing magnetism in a flowstream of an at least partially magnetisable particulate feed material suspended in a liquid involving the steps of:

- passing the flowstream through a treatment chamber; and selectively activating a magnetic source with respect to the treatment chamber,
- such that, when activated, the magnetic source induces magnetism in at least some of the particulate feed material located in the chamber.

Preferably activation of the magnetic source involves moving that source into and out of proximity with the treatment chamber.

Preferably at least some of the magnetisable feed material is paramagnetic, the induced magnetism causing at least some of the magnetised paramagnetic particles to become aggregated in the liquid flowstream.

In yet a further broad form there is provided a process for magnetising a portion of a feed material, the portion including material fractions having a range of magnetic susceptibilities, the process operable to induce magnetism in the portion so as to facilitate the subsequent separation of a more weakly magnetic feed material fraction from a more strongly magnetic feed material fraction.

Preferably the subsequent separation from the portion of the weakly magnetised feed material is facilitated by a flotation separation process.

Preferably the flotation separation process recovers the weakly magnetised feed material in a froth phase.

Preferably the more weakly magnetic feed material fraction includes mainly paramagnetic particulates and the more strongly magnetic feed material fraction includes mainly ferromagnetic particulates.

In yet a further broad form there is provided an apparatus for inducing magnetism in a flowstream of an at least partially magnetisable particulate feed material suspended in a liquid, in use to condition the flowstream to enhance the subsequent separation process, the apparatus including:

a treatment chamber having an inlet and an outlet through which the flowstream respectively enters and exits the chamber; and a magnetic source within the treatment chamber, said magnetic source substantially continuously immersed in and activated with respect to the flowstream.

Preferably the magnetic source has magnetic material mechanically removed from it without the magnetic source exiting the flowstream or being deactivated during the step of mechanical cleaning thereby continuously magnetizing the flowstream.

Preferably the magnetic source located in the flowstream has magnetised material removed from the magnetic source by a wiper or series of wipers moving over a face of the magnetic source in combination with the action of the moving flowstream thereby to wash the magnetic material cleaned from the magnetic source back into the flow stream and through the chamber.

Preferably the magnetised material removed from magnetic source remains in the flowstream and is not removed from the flowstream.

Preferably the wiper is made of metal, plastic or rubber or stainless steel, or another metallic or non-metallic material.

Preferably the magnetic material is removed by wiping into the flowstream the magnetic material attached to the magnetic source without removing the magnetic source from the flowstream or de-activating the magnetic source, or removing the magnetic material from the flowstream.

Preferably the wiper is moved along the surface of the magnetic source so as to wipe the attached magnetic material into the flowstream.

Preferably the wiper is moved by a pneumatic piston.

Preferably the wiper is moved by an electric motor.

Preferably the wiper is moved in a longitudinal direction along the surface of the magnetic source.

Preferably the wiper is moved in a latitudinal direction along the surface of the magnetic source.

Preferably the wiper disturbs the magnetic material so that the flow of the flowstream washes the magnetic material into the flowstream.

Preferably the apparatus includes a series of wipers used to wipe the magnetic source.

Preferably the magnetic source has a magnetic induction at the flowstream/magnetic source interface of greater than 4500 gauss.

Preferably the magnetic source has a magnetic induction at the flowstream/magnetic source interface of greater than 4500 gauss over the whole face of the magnetic source.

Preferably the feed material includes paramagnetic and ferromagnetic particulates.

Preferably the feed material includes paramagnetic and diamagnetic particulates.

Preferably the paramagnetic particulates include at least one sulfide mineral containing copper, zinc, nickel, lead, or another transition metal or a precious metal such as gold, silver or platinum group metals.

Preferably the paramagnetic particulates include at least one of the group including sphalerite contaminated with iron, arsenopyrite, cassiterite, chalcopyrite, bornite, galena, pentlandite, platinum metal gold, silver and palladium metal.

In yet a further broad form there is disclosed an apparatus for magnetizing a portion of a feed material, the apparatus including:

a treatment chamber having an inlet and an outlet through which the flowstream respectively enters and exits the chamber; and a magnetic source within the treatment chamber;

wherein the magnetic source has magnetic material cleaned/removed from it without the material exiting the flowstream or the magnetic source being de-activated thereby to continuously magnetize the flowstream.

Preferably the magnetic source is located in the flowstream and has magnetic material removed from it by a wiper moving over the face of the magnetic source.

Preferably the magnetic source is arranged such that when it removes the magnetiseable material the material remains in the flowstream and is not removed.

Preferably the flowstream moves substantially perpendicular to the movement of the wiper of the magnetic source.

Preferably the magnetic source induces magnetism in at least a portion of the particulate feed material in the chamber; the portion including material fractions having a range of magnetic susceptibilities, the apparatus including a treatment chamber and a magnetic source permanently activated with respect to the treatment chamber to induce magnetism in the portion so as to facilitate the subsequent separation of a more weakly magnetic feed material fraction from a more strongly magnetic feed material fraction and a least magnetic feed material fraction.

Preferably the more weakly magnetic feed material fraction includes mainly paramagnetic particulates and the more strongly magnetic feed material fraction includes mainly ferromagnetic particulates and the least magnetic material fraction includes mainly diamagnetic particulates.

In yet a further broad form there is disclosed an apparatus for inducing magnetism in a flowstream of an at least partially magnetisable particulate feed material suspended in a liquid, the apparatus including:

a treatment chamber having an inlet and an outlet through which the flowstream respectively enters and exits the chamber; and a magnetic source within the treatment chamber;

and wherein the magnetic source remains in the treatment chamber and is permanently activated.

Preferably the magnetic source has magnetic material cleaned/removed from it without exiting the flowstream or being de-activated thereby to continuously magnetize the flowstream.

Preferably the magnetic source is located in the flowstream and has magnetised material removed from it by a wiper moving over the face of the magnetic source.

Preferably the magnetic source removes the magnetiseable material whilst remaining in the flowstream and is not removed from the flowstream.

Preferably when activated in use the magnetic source induces magnetism in at least a portion of the particulate feed material in the chamber whilst maintaining that portion in the flowstream in the treatment chamber.

In a further broad form there is disclosed a process for magnetizing a portion of a feed material, the portion including material fractions having a range of magnetic susceptibilities, the process including the steps of passing the feed through a treatment chamber containing a magnetic source to induce magnetism in the portion so as to enhance the subsequent separation of a more weakly magnetic feed material fraction from a more strongly magnetic feed material fraction and a least magnetic feed material fraction.

Preferably the process also including the step of subsequently separating the weakly magnetised feed material fraction from the more strongly magnetised feed material fraction and a least magnetic feed material fraction by a flotation separation process.

Preferably the process also including wherein the flotation separation process recovers the weakly magnetised feed material in a froth phase.

Preferably the process also including wherein the more weakly magnetic feed material fraction includes mainly paramagnetic particulates and the more strongly magnetic feed material fraction includes mainly ferromagnetic particulates and the least magnetic feed material fraction includes mainly diamagnetic particulates.

Preferably the process also including wherein at least some of the magnetisable feed material is paramagnetic, the induced magnetism causing at least some of the magnetised paramagnetic particles to become aggregated in the liquid flowstream.

Preferably the process also including wherein at least some of the magnetisable feed material is paramagnetic, the induced magnetism causing at least some of the magnetised paramagnetic particles to become aggregated in the liquid flowstream so as to reduce its recovery by entrainment in a froth phase.

Preferably the process also including wherein at least some of the magnetisable feed material is paramagnetic, the induced magnetism causing at least some of the magnetised paramagnetic particles to become aggregated in the liquid flowstream so as to reduce its recovery by entrainment in a froth phase thereby maintaining the aggregated mineral in the slurry phase and allowing a subsequent recovery in a subsequent froth phase.

Preferably the process also including wherein field enhancement is implemented as a wiper mechanism or series of wiper mechanisms operating over the external surface of the magnetic source.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
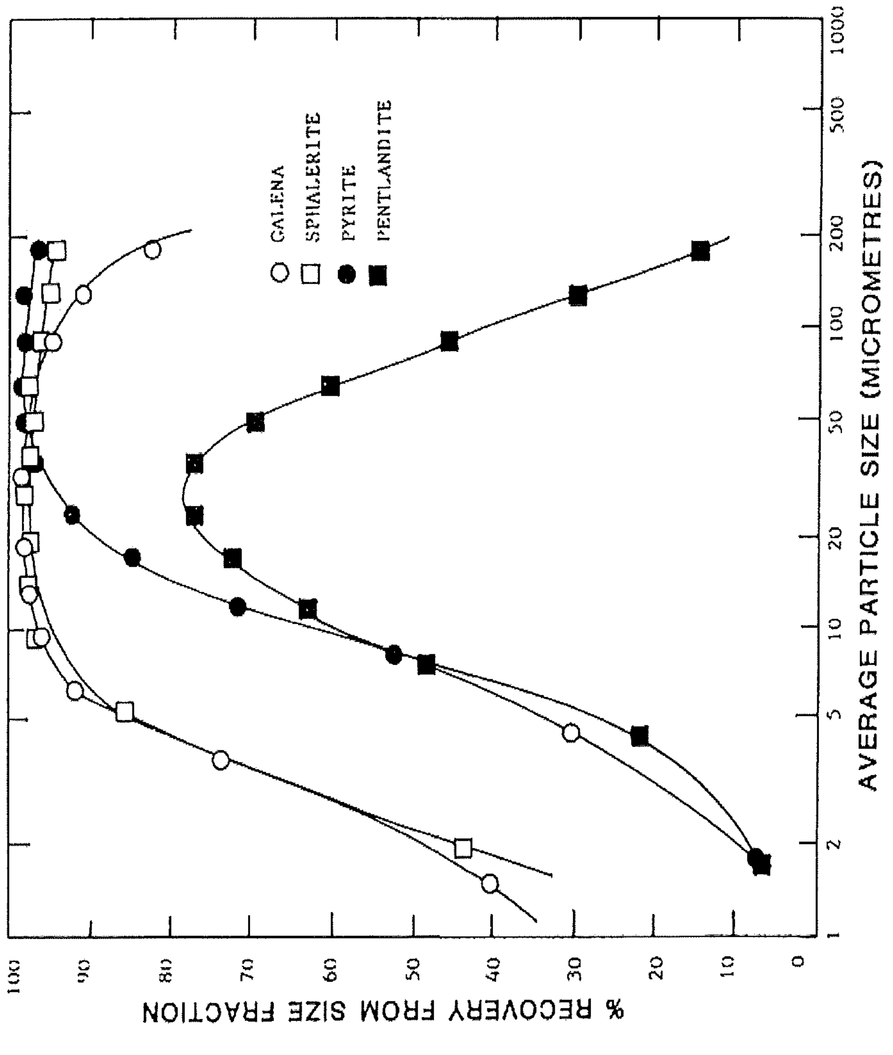
FIG. 1 Mineral recovery by flotation for different sulphide particle sizes (Ahmed et al. 1989)

It has become apparent in recent testwork that magnetic conditioning s changing the paramagnetic mineral detected in different flowstreams UPSTREAM of the magnetic conditioning installation. It is postulated that the only mechanism by which this could occur is if the magnetic conditioning is impacting the process water from the dewatering separations that are downstream of the magnetic conditioning, where the water is recycled and then reports upstream of the magnetic conditioning. This is not to say it is impacting the H2O molecules but it is impacting the minerals that are suspended in the water. Therefore, suspended paramagnetic minerals and very fine paramagnetic minerals are impacted as they pass the magnetic conditioning so that the content and characteristics (size via being aggregated or not aggregated) are different when they are recycled in the process water, compared to when no magnetic conditioning is employed. This difference is either in concentration or in particles size of these suspended paramagnetic minerals in the recycled process water.

Where magnetic conditioning has been installed two different impacts UPSTREAM of the magnetic conditioning have been measured to very high statistical confidence. Firstly, a decrease in the amount of paramagnetic mineral has been detected in the UPSTREAM process. The most likely mechanism for this would be that the magnetic conditioning is aggregating the very fine <10 μm paramagnetic minerals and in the downstream processes these aggregated concentrate minerals dewater (filter and settle) more efficiently, report to the final saleable product rather than the process water and so their concentration in the recirculating plant water is reduced.

Secondly, there has been a measured increase in paramagnetic mineral in the UPSTREAM process. The possible reason for this is that magnetic conditioning is aggregating very fine paramagnetic minerals (chalcopyrite CuFeS2), sphalerite (Zn/FeS) or other valuable paramagnetic sulphide minerals). So when the process water recirculates containing these fine minerals where magnetic aggregation has been operating, these minerals have been aggregated from <8-10 μm size to >8-10 μm size; they are now filtered out of the process streams, recovered to the filter cake and SO detectable in the plant flowstreams. Whereas, when magnetic conditioning is not operating, the <8-10 μm mineral remains <8-10 μm, is not filtered out from the process stream and so not detected in the plant. The mineral is there but because it is not aggregated it is not filtered and therefore not detected.

There are then two mechanisms postulated about how magnetic conditioning can impact the UPSTREAM plant assays. The two mechanisms have an opposite effect on the paramagnetic mineral recirculating in the process water. One mechanism reduces one and detectable (and increases the in fact recoverable) metal in the process streams. Both mechanisms are at work, but one may predominate over the other.

Therefore, in a plant with poor thickening and filtering of the fine mineral in its concentrate, the reduction in mineral recirculating to the UPSTREAM process in the process water may predominate. But in a plant with good thickening and filtering of its concentrate and less paramagnetic mineral in its process water then the aggregating of the <8-10 μm mineral to a filterable >8-10 μm with magnetic conditioning may increase the filtration and detection of fine mineral in its UPSTREAM process.

EXAMPLES

Example 1

At a mine in Australia that grinds to very fine size (concentrate is 80%<15 μm) the magnetic conditioning reduced the concentration of Zn and Ag in the feed by up to 5%. The table below gives the % Zn and Ag in the plant feed upstream of the magnetic conditioning. The results are to an extremely high level of confidence.

| | % Zn in plant feed | ppm Ag in plant feed |
|---|---|---|
| Magnetic conditioning ON | 7.58 | 130 |
| Magnetic conditioning OFF | 8.09 | 136 |
| Difference | 0.51 | 6.0 |
| Level of confidence | 99.9% | 99 |

Example 2

At a mine in Canada that grinds quite coarse (80%<150 μm) the magnetic conditioning increased the Cu in feed by about 5%. It can be seen that the increase causes a significant and very beneficial increase in saleable Cu recovered to the concentrate.

| % Cu Results | % Cu in feed | Tons of Cu in concentrate (normalised) |
|---|---|---|
| Magnetic conditioning ON | 0.769 | 100 |
| Magnetic conditioning OFF | 0.723 | 94 |
| Difference | 0.046 | 6 |
| Level of Confidence | 99% | 99% |

Example 3

At a mine in Africa that grinds quite coarse (80%<110 μm) the magnetic conditioning increased the % Cu in feed by about 14% over a 3-month period.

| % Cu Results | % Cu in plant feed |
|---|---|
| Magnetic conditioning ON | 0.87 |
| Magnetic conditioning OFF | 0.76 |
| Difference | 0.011 |
| Level of Confidence | 95% |

Example 4

At a mine in Asia that also grinds quite coarse (80%<110 μm) an evaluation of magnetic conditioning was carried out. There was no re-circulating water from the Copper concentrate thickener or the Copper filter back to the grinding circuit. During this test no increase in % Cu in the feed with the magnetic conditioning to a high level of confidence was measured, but the magnetic conditioning still increased the Cu recovery

| | % Cu in Feed | % increase in Cu Recovery |
|---|---|---|
| Magnetic Conditioning ON | 2.07 | 91.1 |
| Magnetic Conditioning OFF | 2.11 | 90.4 |
| Difference | 0.04 | 0.7 |
| Level of Confidence | Very low | 95% |

At the same mine when the magnetic conditioning was tested in an identical position, the only difference being that now water from the downstream filtering and thickening processes was recirculated back to the grinding circuit magnetic conditioning not only increased the Cu recovery but also there was a measured increase in the % Cu in feed by about 7%.

| % Cu Results | % Cu Cyc Oflow | % Cu Recovery |
|---|---|---|
| Magnetic conditioning ON | 1.87 | 90.9 |
| Magnetic conditioning OFF | 1.75 | 90.2 |
| Difference | 0.11 | 0.7 |
| Level of Confidence | 99% | 99% |

If with magnetic conditioning there is a higher rate of recovery and a higher amount of metal in the feedstream this is a much better production of metal for payment; rather than an equally higher recovery with the same amount of metal in the feedstream.

Example 5

FURTHER EXAMPLES

At one site the % Zn in flowstream 14 feed increased by 3% when magnetic conditioning was ON to high confidence

| % Zn Results | % Zn in feed |
|---|---|
| Magnetic conditioning ON | 6.80 |
| Magnetic conditioning OFF | 6.58 |
| Difference | 0.22 |
| Level of Confidence | 93% |

Example 6

At another site the % Cu in flowstream 14 feed increased when magnetic conditioning was ON by about 7%.

| % Cu Results | % Cu in feed |
|---|---|
| Magnetic conditioning ON | 2.39 |
| Magnetic conditioning OFF | 2.22 |
| Difference | 0.17 |
| Level of Confidence | 94% |

This is a surprising result. Firstly, it is surprising that the magnetic conditioning can be impacting a process UPSTREAM of its location in the process. This is unexpected and was not anticipated. Secondly, it is surprising because there are many steps between the magnetic conditioning and the upstream process, all of which would be expected to break some aggregates. And thirdly, it is surprising that there is significant amounts of <10 μm mineral in the process water, this is not expected, if it was plants would be using filter papers with smaller pore sizes because they are trying to measure the true process effect. The magnitude of the change with magnetic conditioning is very surprising.

Figure 2:
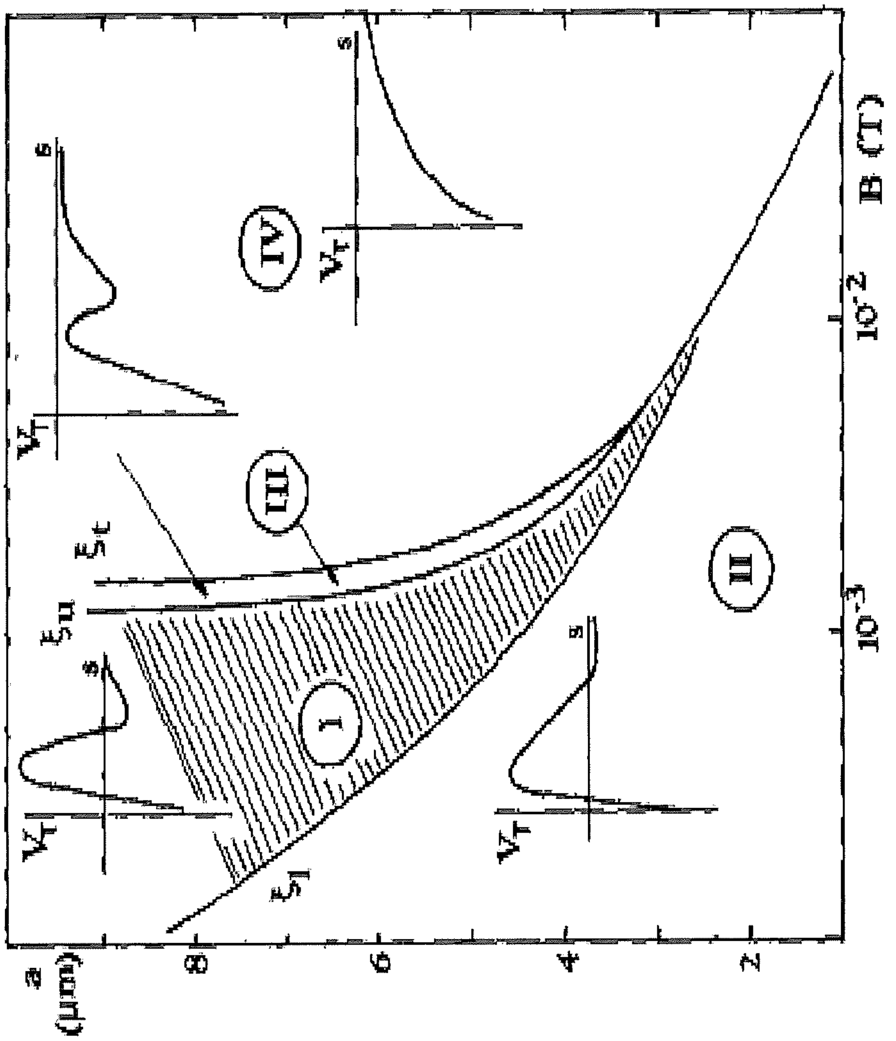
FIG. 2 A generalised description of the total energy of interaction for paramagnetic ultrafine particles as a function of particle size (a) and magnetic induction B (Svoboda, 1983)

A possible reason why this UPSTREAM impact is being detected now, whereas, it wasn't detected previously is that the magnetic fields used for magnetic conditioning have increased and it can be seen from FIG. 2 that the stronger the field the smaller the particles that will aggregate. In the early magnetic conditioners the field strength on the face had a maximum field of 3000-4000 gauss. However, because of developments in the magnetic arrays the magnetic field strengths of the current magnetic conditioners are more than 5000 gauss and some are as high as 7000-8000 gauss. This increase, while not appearing significant from the FIG. 2, may be very significant in real process conditions, given the assumptions of the Svoboda model and the reality of process plants.

Example 7

It has been established that in an environment where water is returned from the flotation recovery process using stronger magnets it does indeed improve the aggregation and/or flotation of the <38 micron paramagnetic minerals.

In a current plant installation magnets with lower magnetic field strengths of around 4000 gauss were compared with a stronger magnets with magnetic field strengths of around 7000 gauss. The zinc recovery as measured at the output filter cake 50 from the filtration stage 35 increased by 1.6%, and this was achieved with a purer final concentrate as measured at point 30 in FIG. 3 prior to entry into the filtration stage 35; so less waste was being recovered to the concentrate.

| Magnetic Field Strength | % Zn in Final Concentrate | % Zn Recovery |
|---|---|---|
| 4000 gauss at surface | 48.3 | 69.6 |
| 7000 gauss at surface | 49.4 | 71.2 |

This clearly shows the benefits of stronger magnetic field strengths in aggregating very fine paramagnetic minerals that occur either in flotation slurries, process water or in improving settling and filtering of fine paramagnetic minerals.

Embodiments of the invention relate using stronger magnetic fields to carry out magnetic conditioning in a flotation recovery circuit which returns recovered process water to the grinding stage and in so doing not only impacting the flotation recovery but the magnetic conditioning of the flotation circuit also impacting a surprising change in the UPSTREAM feed grade due to magnetic conditioning.

First Preferred Embodiment

Figure 3:
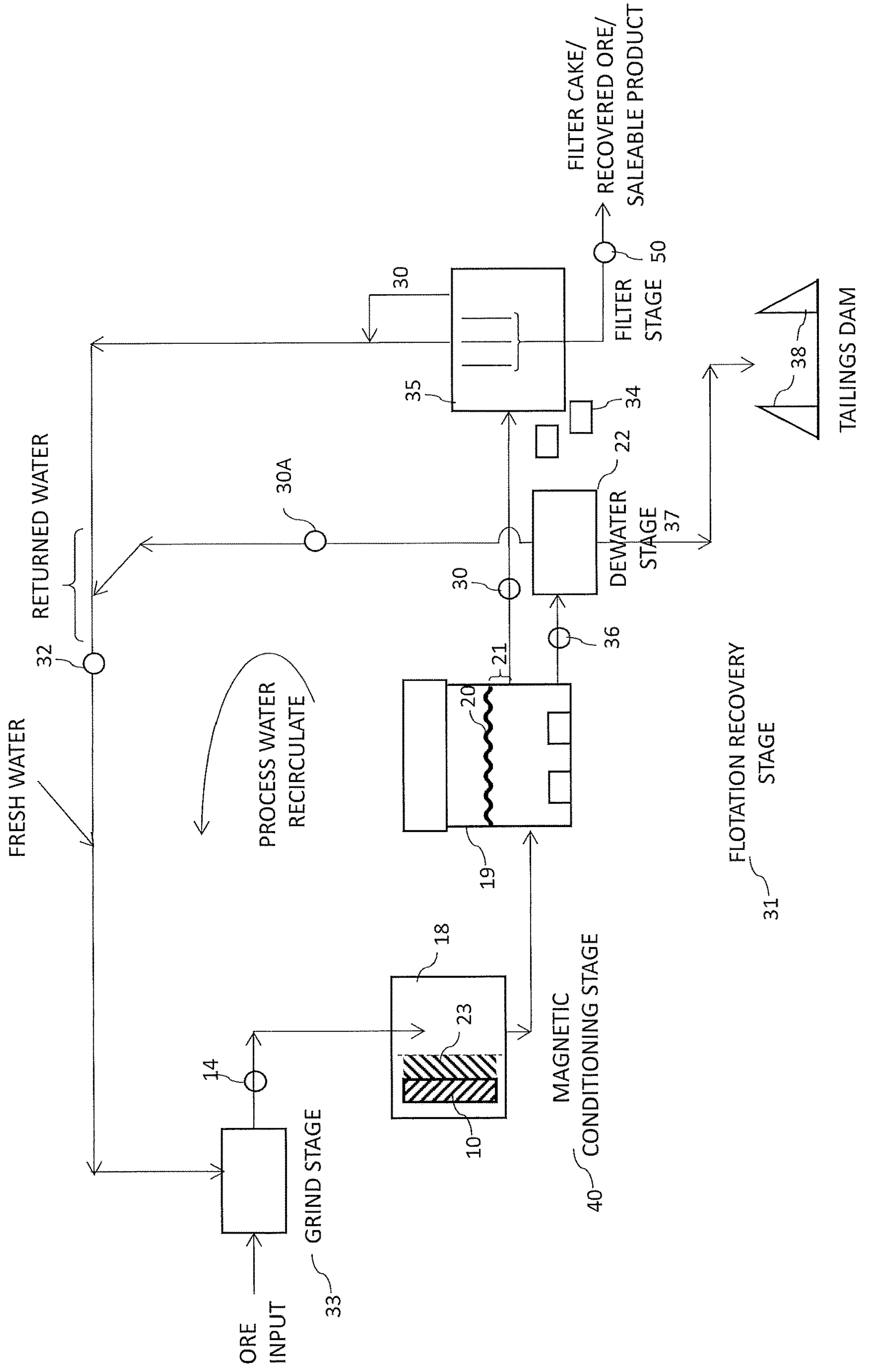
FIG. 3 is a block diagram of a mineral processing circuit applicable to embodiments of the present invention.

With reference to FIG. 3 there is illustrated a block diagram of a mineral processing circuit applicable to embodiments of the present invention.

Figure 8:
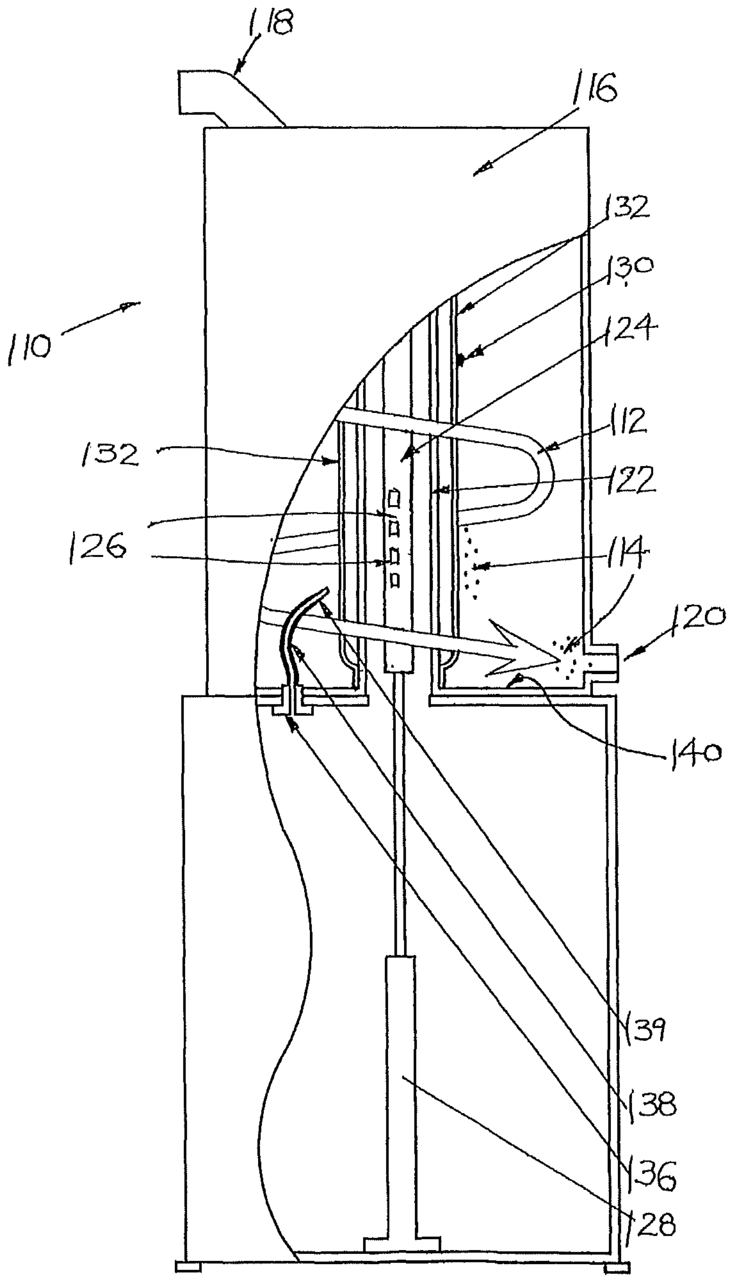
FIG. 8 is a part cutaway view of an apparatus for inducing magnetism in accordance with a second embodiment of the invention.

With reference to FIG. 8 there is illustrated an alternative apparatus for inducing magnetism in the flowstream.

The apparatus illustrated and described with reference to FIGS. 4 to 7 may be located in the magnetic conditioning stage 40 illustrated in the process diagram of FIG. 3. The apparatus causes the magnetic source 10 to apply an increased range of magnetic field strength to the ground ore portion during this stage thereby to cause increased recovery by improved recovery at the flotation stage 31 arising from the increased range of magnetic field strength; the process interacting with the recovered process water in which the ground ore portion is contained.

In a preferred form, the magnetic field strength applied is at least 4500 Gauss. More preferably the magnetic field strength is at the range of 4500 to 10000 Gauss. More preferably, the magnetic field strength is in the range of 5000 to 10000 Gauss.

In a further aspect with reference to the discussion in the background art, there will now be described apparatus and a methodology to maximize the magnetic induction in the slurry flowstream by maximizing the magnetic induction strength of the magnetic source and by minimizing the distance between the magnetic source and the slurry flowstream with a ferromagnetic cleaning mechanism that maintains the magnetic source in a stationary position within the flowstream to maximize slurry residence time in the magnetic field.

Figures 4, 4A, 4B:
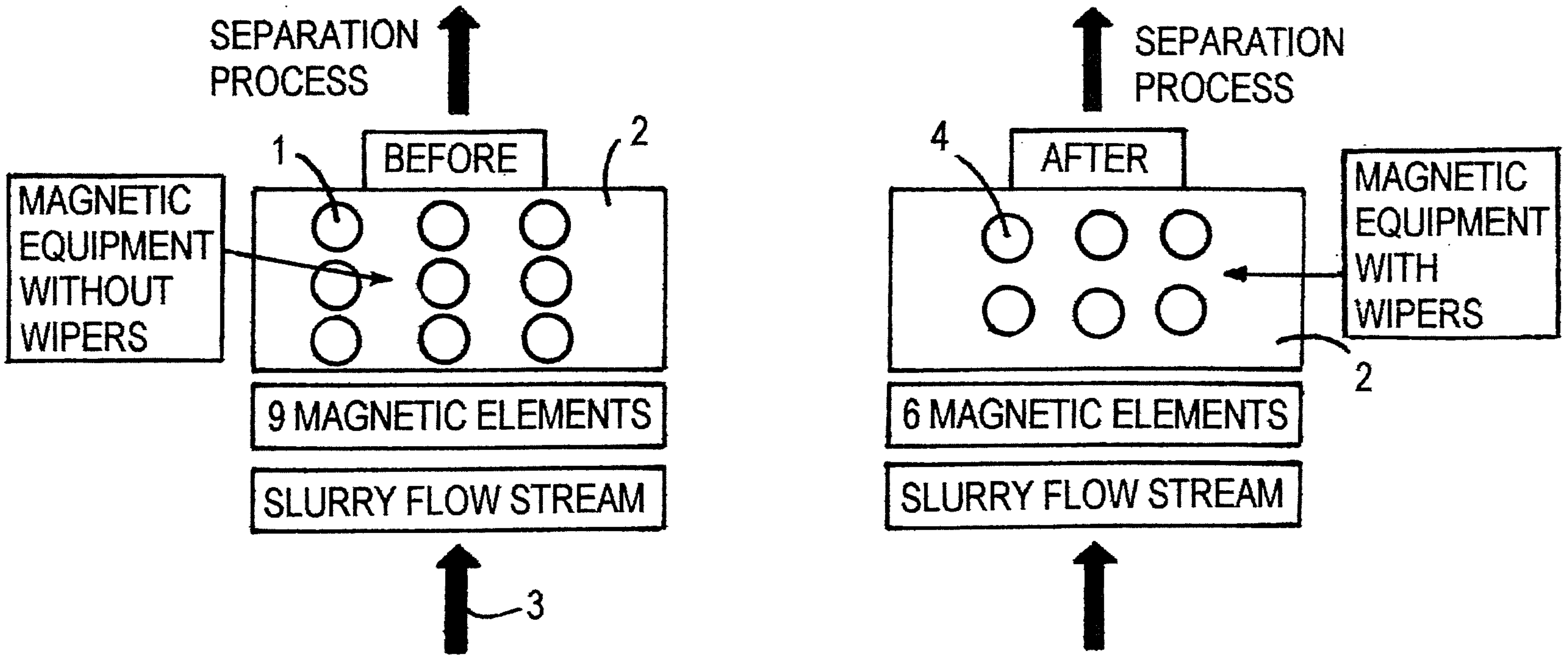
FIGS. 4A and 4B illustrate the effect of equipment sizing on using wiper magnetising according to a first-preferred embodiment of the present invention.
Figure 5:
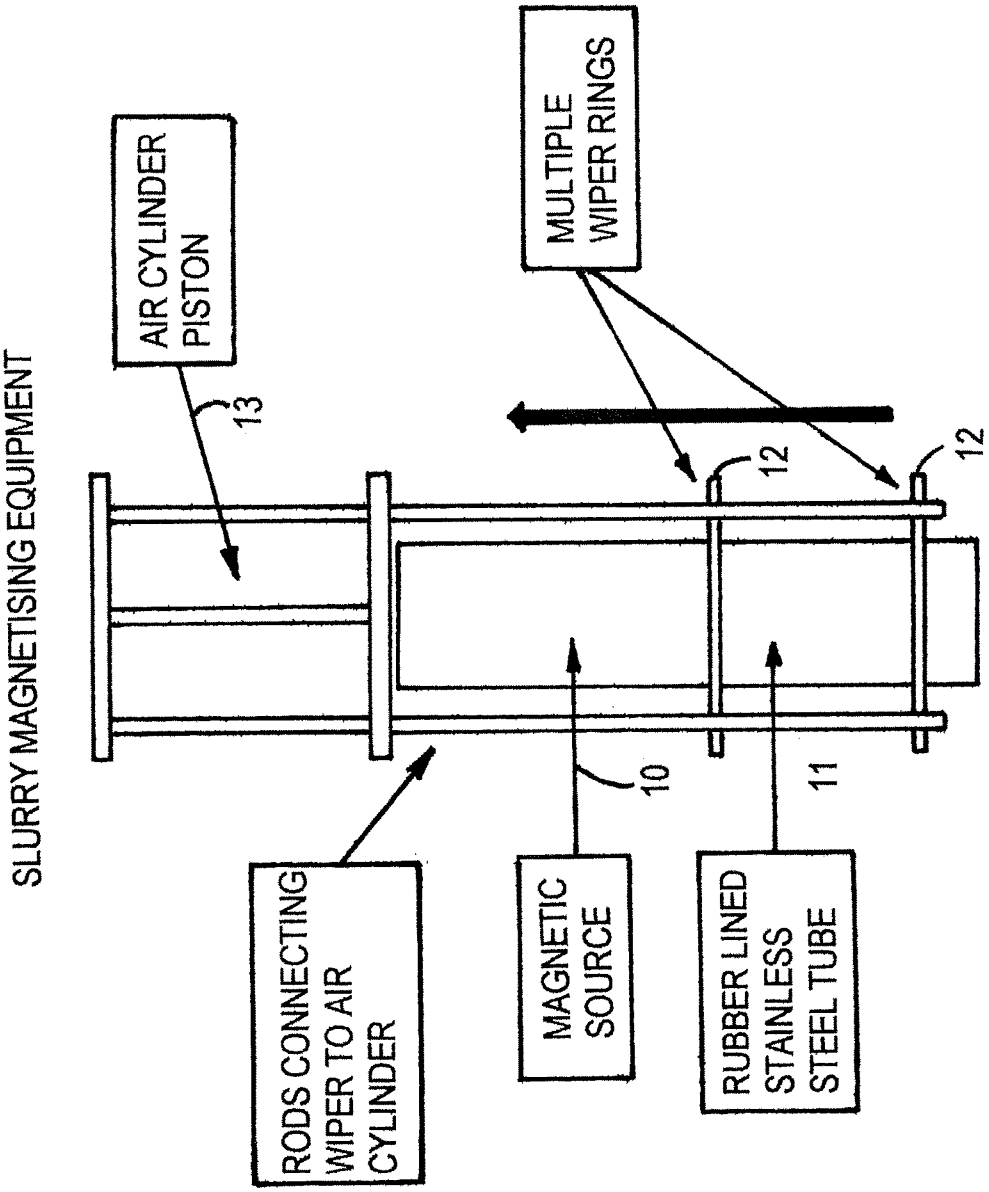
FIG. 5 illustrates the slurry magnetising equipment according to a first preferred embodiment of the invention.

The importance of the higher field strength due to wiper cleaning and the greater residence time in the magnetic field due to continuous activation of the magnetic source in the slurry flowstream allows for greater magnetization and aggregation of the mineral particles and reduced equipment requirements, therefore improving the overall process. This is represented diagrammatically in FIGS. 4A, 4B. FIGS. 4A, 4B illustrates the effect of equipment sizing on using wiper magnetising. In the cleaning process the magnet may be de-activated for 25%-35% of the time to clean the magnet. With this invention because deactivation of the magnetic source does not occur, the number of magnetic sources can be reduced by 25%-35%.

In this instance the arrangement of FIG. 4A shows an arrangement of magnetic sources 1 in an array within a predetermined treatment volume 2. In this instance there are nine sources intended to achieve a predetermined level of magnetic irradiation of a flowstream 3 passing there through.

FIG. 4B illustrates the same predetermined treatment volume 2 this time with magnetic sources 4 having associated therewith wipers (refer later description) which mechanically clean the exterior of the sources 4 whilst the sources 4 are retained within the flowstream 3 on a continuous basis. As has been described above and with reference to the later described embodiments a smaller number of sources 4 can achieve the same level of magnetic irradiation for the same predetermined treatment volume 2.

In a further aspect, again with reference to the discussion in the background art, there will now be described alternative apparatus and methods for cleaning the magnetic source housing that does not require the deactivation of the magnetic source by movement of the magnetic source in and out of the slurry and so allows the magnetization of the slurry flowstream to be maximized.

A wiping mechanism to wipe off the build-up of the ferromagnetic minerals.

This method of cleaning has these advantages:

Higher magnetic inductions are achievable because the magnet is closer to the slurry. A stainless steel housing can be as thin as 1 mm with a 1 mm wear lining, whereas, for a moving magnet, there is the tolerance for the movement, a thicker stainless steel housing is required because of the mass moved, wear resistant guides are required and the thickness of a wear lining this all adds up to around 10 mm.

Larger, heavier and therefore stronger magnetic sources can be used increasing the magnetic induction of the slurry.

Less energy is required for wiping than lifting a heavy magnet.

Lower cost of production.

Cleaning the magnetic source is faster since no magnet movement is require so the magnet spends no time out of the slurry and the slurry is better magnetised.

Safer operation less potential exposure to magnetic-field.

Lower maintenance costs.

More flexibility in magnet designs because the magnet is not moving or attached to a piston.

This preferred method with reference to FIGS. 4A, 4B, 5, 6 works by the magnetic source 10 being housed in a stainless steel housing 11 with a very thin abrasion resistant rubber lining and a rubber lined stainless steel scraper 12 on a piston 13 moving vertically up and down the external face 11 of the magnetic housing 11. The magnetic source 10 in the housing 11 with the scraper 12 attached is located in the slurry flowstream 14. As the scraper 12 moves over the face of the magnetic housing 11 it disturbs and dislodges the ferromagnetic material 15 that has built, while still attracted to the magnet. The force of the moving flowstream 14 is sufficient to force the magnetic material 15 back into the flowstream 14 and away from the magnetic source 10, thus cleaning the build-up of magnetic material 15 on the magnetic housing 11.

A wiping mechanism combined with the flowstream washing to wipe off the build-up of the ferromagnetic minerals.

This method of cleaning has these advantages:

Higher magnetic inductions achievable because the magnet is closer to the slurry. A stainless steel housing can be as thin as 1 mm with a 1 mm wear lining, whereas, for a moving magnet, there is the tolerance for the movement, a thicker stainless steel housing is required and the thickness of a wear lining this all adds up to around 10 mm.

Less energy is required for wiping than lifting a heavy magnet

Lower cost of production and maintenance

Single or multiple wipers mean cleaning the magnetic source is faster since no magnet movement is require so the magnet spends no time out of the slurry and the slurry is better magnetised Safer operation less potential exposure to magnetic field More flexibility in magnet designs because the magnet is not moving or attached to a piston.

Figure 6:
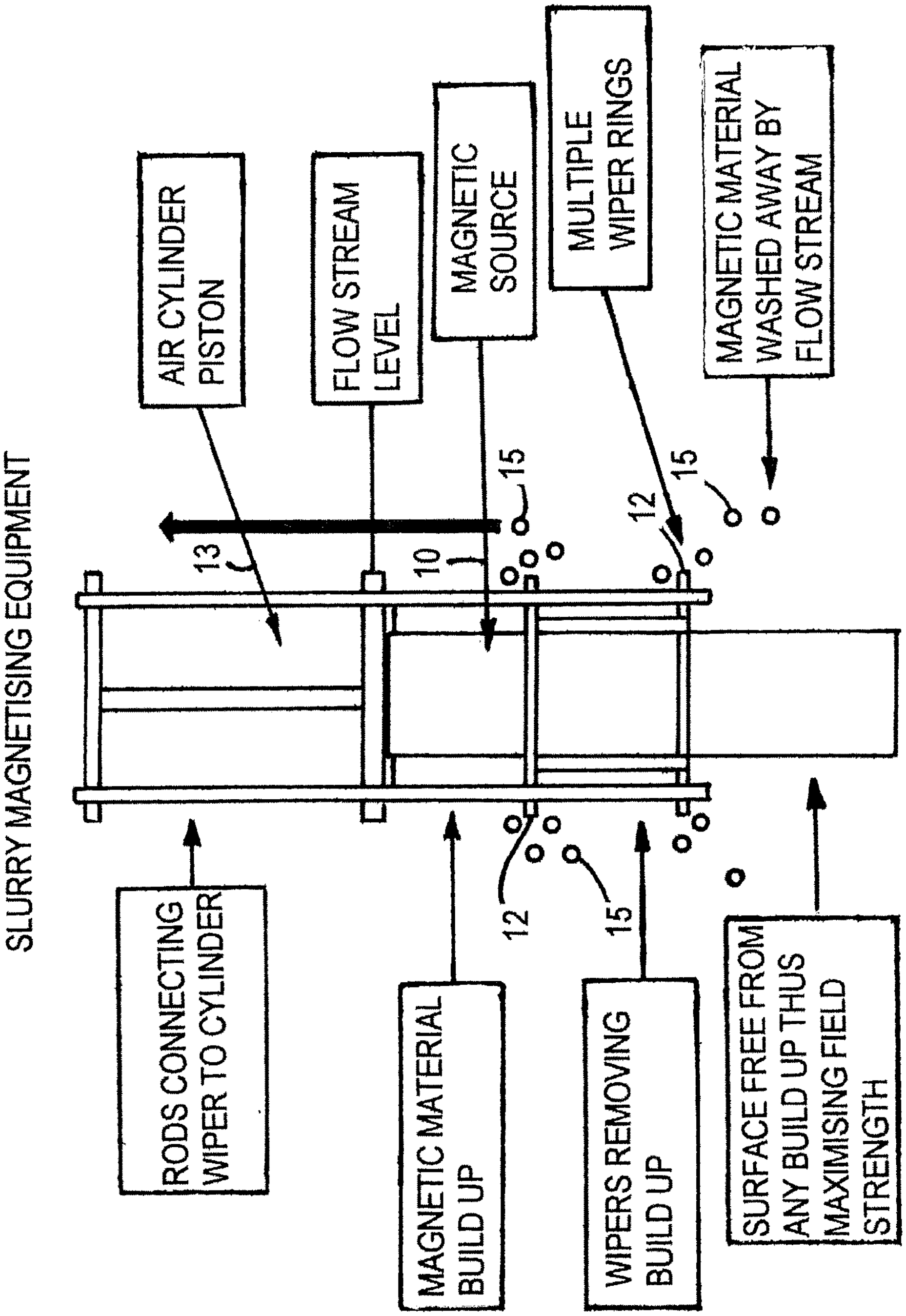
FIG. 6 shows the effect of the combined wiping and flowstream movement in wiping the magnetic housing clean and removing the build-up of ferromagnetic material into the flowstream.

FIG. 6 illustrates the slurry magnetising equipment according to a preferred embodiment of the invention. Like components are numbered as for the embodiment described above with reference to FIG. 5.

FIG. 6 shows the effect of the combined wiping and flowstream movement in wiping the magnetic housing clean and removing the build-up of magnetised material including ferromagnetic material into the flowstream.

This method (refer FIG. 6) works by the magnetic source 10 being housed in a thin stainless steel housing 11 (1 mm) with a very thin rubber lining (1 mm) and one or more rubber lined stainless steel wipers or scrapers 12 mounted on a piston 13 which moves vertically up and down the external face 11 of the magnetic housing 11. The magnetic source 10 in the housing 11 with the scraper 12 attached is located in the slurry flowstream 14. As the scraper 12 moves over the face 11 of the magnetic housing 11 it disturbs and dislodges the ferromagnetic material 15 that has built-up, while still attracted to the magnet. The force of the moving flowstream 14, which is generally and most advantageously perpendicular to the wiper movement combined with the action of the wiping mechanism is sufficient to force the magnetic material 15 back into the flowstream and away from the magnetic source 10, thus cleaning the build-up of magnetic material 15 on the magnetic housing 11.

Flow rates will vary depending on the plant. Typical flow rates can be in the range from 20 m3/hr to 5000 m3/hr.

In Use

Figure 7:
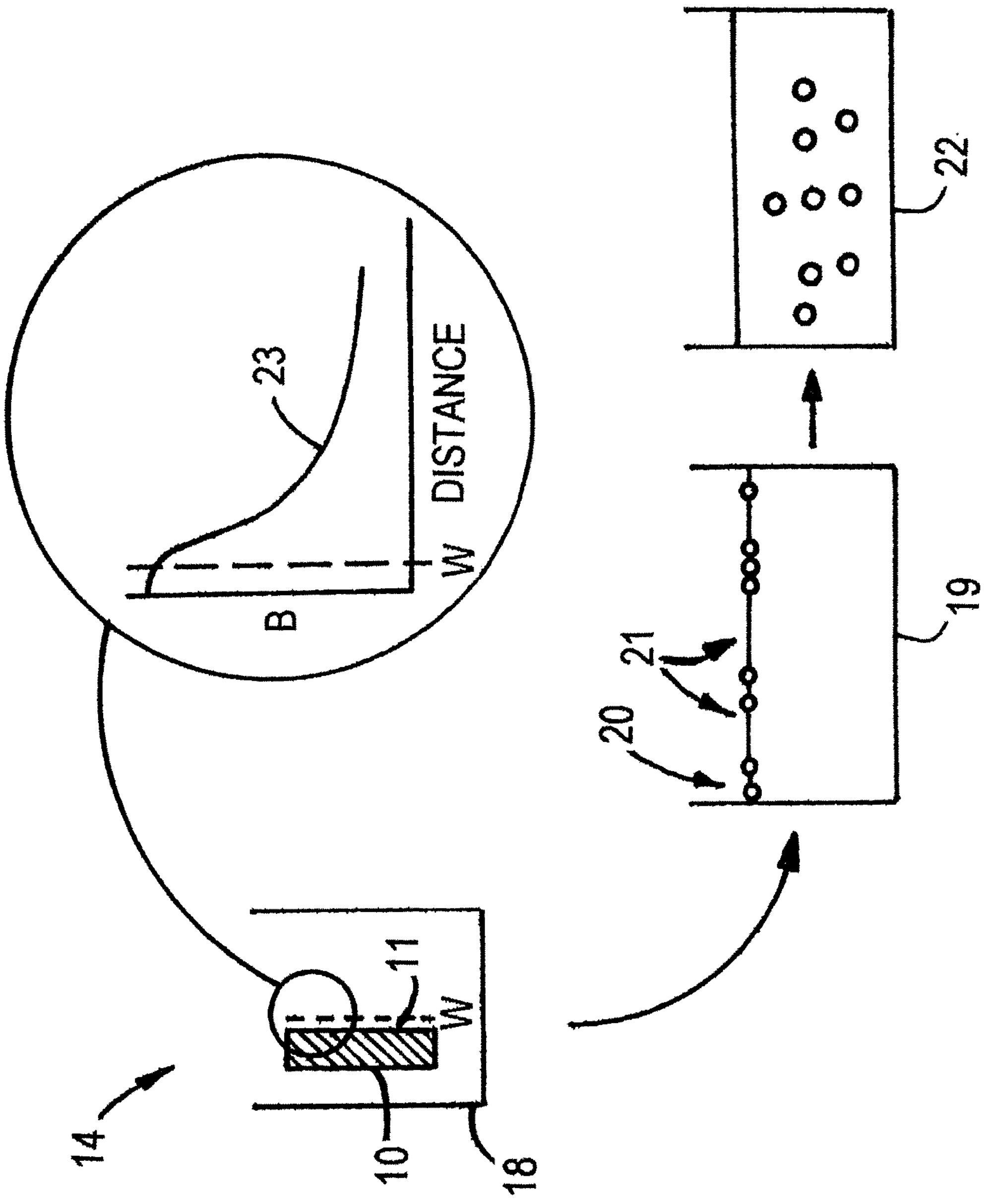
FIG. 7 is a diagram of application of embodiments of the present invention in a process environment.
Figure 9:
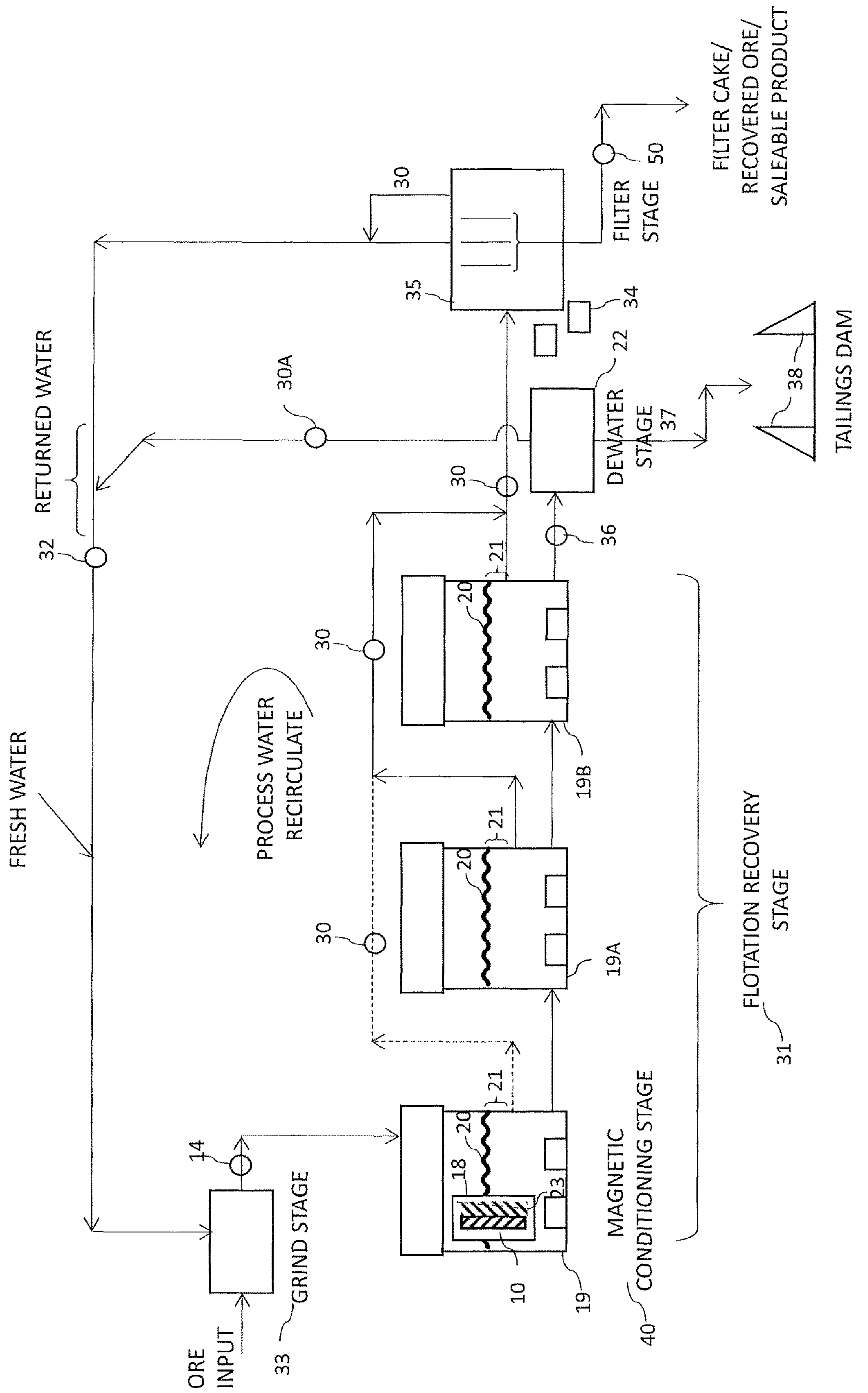
FIG. 9 is a block diagram of a mineral processing circuit applicable to further embodiments of the present invention.

With reference to FIGS. 3, 7 and 9, there is illustrated diagrammatically possible usage scenarios for one or more embodiments previously described. In use in a typical ore processing plant a flowstream 14 containing particles of valuable ore passes into a magnetic conditioning stage in this instance in the form of processing chamber 18 having at least one magnetic source 10 located therein. The source 10 has a high strength magnetic field 23 which can fall away sharply with distance from the source as illustrated in the inset graph of FIG. 7. To this end a thin walled housing 11 having an external face 11 only a relatively short distance from the magnetic source 10 is utilised so as to maximise the high strength field to which the flowstream 14 is exposed as it passes through the chamber 18. In one form the magnetic source 10 is fitted with a scraper 12 (refer FIGS. 5, 6) or similar arrangement thereby to periodically dislodge material which may have accumulated on face 11. The flowstream 14 and a substantial portion of the valuable ore particles entrained within it including any dislodged material 15 continues on to a further treatment tank 19 where valuable ore may be separated from the flowstream 14 by a flotation process wherein aggregated weakly magnetic particles 20 are actively floated in the froth 21. The amount of target particles is maximised and the amount of non-target particles entrained in the froth may be minimised. In a further particular embodiment those aggregated weakly magnetic particles not selected by the flotation process in tank 19 nor entrained in the froth can pass to a further treatment tank or tanks 19A, 19B (refer to FIG. 9) where a further flotation process may be instigated and wherein a different target particle may be selected for flotation, or the aggregated weakly magnetic particles may pass to a settling tank 22 for dewatering and to tailings 38. It will be appreciated that the magnetic conditioning stage should be placed so as to operate on the flowstream 14 before significant processing occurs in the flotation process in order to optimize the effect of the magnetic conditioning stage 40.

In this instance placing the magnetic conditioning stage very early in the flotation recovery stage supports a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage.

Figure 10:
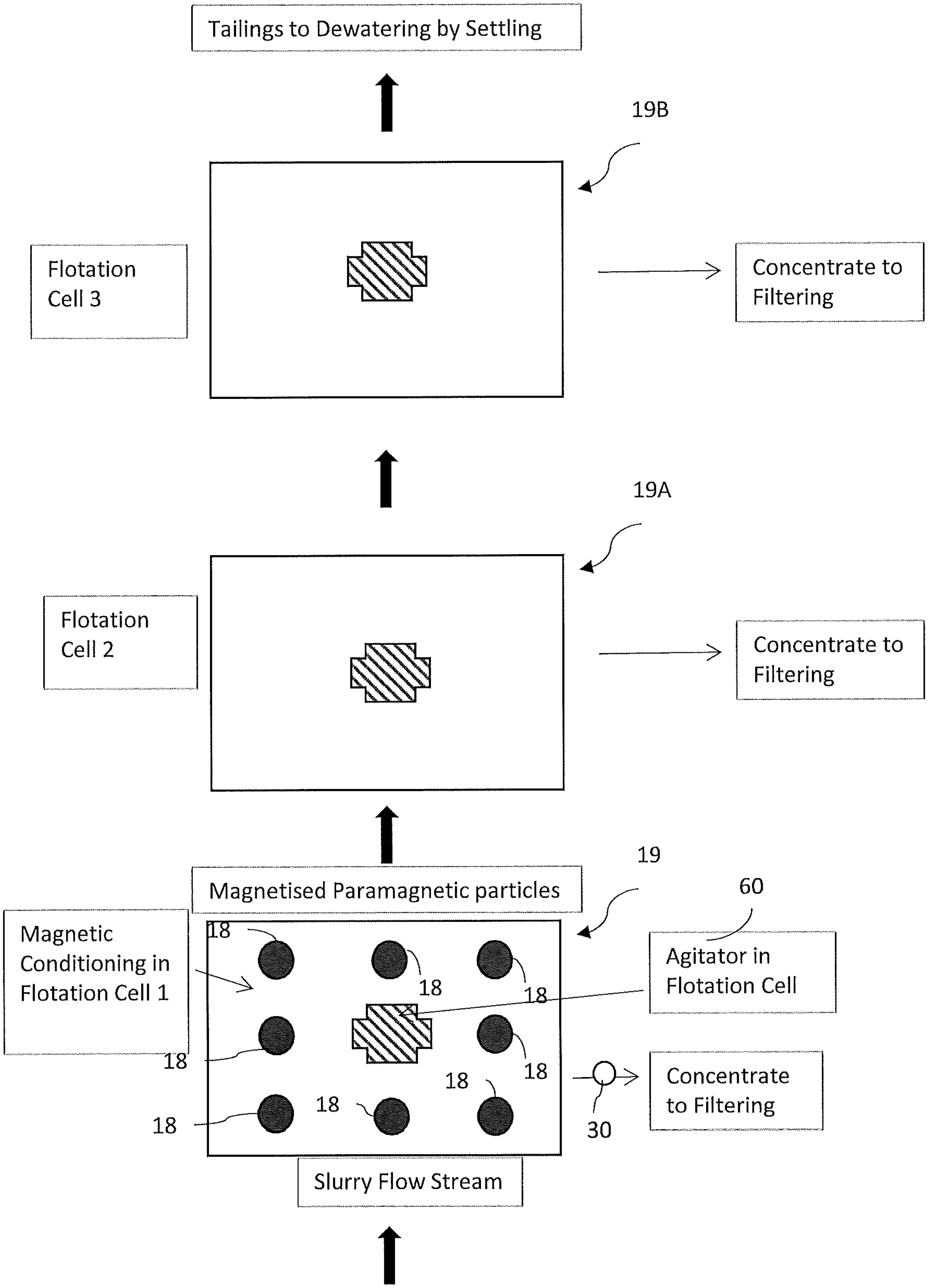
FIG. 10 is a block diagram of a flotation recovery stage incorporating magnetic conditioning according to a further embodiment of the present invention.

With reference to FIG. 10 there is illustrated a specific arrangement of processing chamber 19 having at least one magnetic source 18 placed in the circuit between the grinding stage and prior to the flotation recovery stage. In this instance eight such magnetic sources 18 are placed within a first flotation cell 19 and distributed evenly throughout. In this instance the first flotation cell 19 contains an agitator 60 which assists in circulating the slurry within the first flotation cell 19. Any concentrate 30 is passed to the filter stage 35 the balance, in this instance, is sent to a further flotation cell 19A and from there, in this instance, to yet a further flotation cell 19B.

With reference to FIG. 3 filtrate 30 from the flotation recovery process 31 effected within the flotation recovery stage 31 or at least a portion thereof may be recirculated via return line 32 to the grinding stage 33.

Filter cake 50 arising from filtration stage 35 exits the process as saleable product.

The tailings dewatering stream 36 from the flotation recovery process 31 or at least a portion thereof also passes to return line 32 as part of the process water recirculation system. Dewatered, settled solids 37 from the dewatering process 37 exit to a tailings dam 38 or like repository.

It is postulated that there are two effects in operation Upstream Flowstream 14 of the magnetic conditioning due to the increased magnetic field strength.

These effects are postulated to have the following impacts: where magnetic conditioning has been installed two different impacts UPSTREAM of the magnetic conditioning have been measured to very high statistical confidence in the plant feed 14.

Firstly, for a constant incoming feed composition a decrease in the amount of paramagnetic mineral has been detected in the UPSTREAM process when magnetic conditioning is on compared with when magnetic conditioning is off. The most likely mechanism for this would be that the magnetic conditioning is aggregating the very fine <10 μm paramagnetic minerals and in the downstream processes these aggregated concentrate minerals dewater (filter and settle) more efficiently and so their concentration in the recirculating plant water stream 32 is reduced. [this postulation is exemplified by example 1 earlier in the specification—despite reduced paramagnetic mineral in the UPSTREAM feed the amount of useful metal portion recovered at the output 50 of the process is increased—refer FIG. 3].

Secondly, for a constant incoming feed composition there has been a measured increase in paramagnetic mineral has been detected in the UPSTREAM process when the magnetic conditioning is on compared with when magnetic conditioning is off. The possible reason for this is that magnetic conditioning is aggregating very fine paramagnetic minerals (chalcopyrite $CuFeS2$), sphalerite (Zn/FeS) or other valuable paramagnetic sulphide minerals). So when the process water recirculates 32 containing these fine minerals where magnetic aggregation has been operating, these minerals have been aggregated from <8-10 μm size to >8-10 μm size; they are now filtered out of the process streams, recovered to the feed sample (14) filter cake and so detectable in the plant flowstreams. Whereas, when magnetic conditioning is not operating, the <8-10 μm mineral remains <8-10 μm, is not filtered out from the process stream and so not detected in the plant. The mineral is there but because it is not aggregated it is not filtered and therefore not detected in the plant sampler (14) [this postulation is exemplified by example 2-6 earlier in the specification—increased paramagnetic mineral in the UPSTREAM feed provides increased opportunity for re-recovery of the metal portion whereby the amount of useful metal portion recovered at the output 50 of the process is increased—refer FIG. 3]

In summary it is postulated that there are then two mechanisms as to how magnetic conditioning can impact the UPSTREAM plant assays. The two mechanisms have an opposite effect on the paramagnetic mineral recirculating in the process water. One mechanism reduces and one increases the detectable (and in fact recoverable) metal in the process streams. Both mechanisms are at work, but one may predominate over the other.

Second Preferred Embodiment

With reference to FIG. 8 there is illustrated an alternative apparatus for inducing magnetism in the flowstream.

The apparatus illustrated and described may be located in the magnetic conditioning stage 40 illustrated in the process diagram of FIG. 3. The apparatus causes the magnetic source 10 to apply an increased range of magnetic field strength to the ground ore portion during this stage thereby to cause increased recovery by improved recovery at the flotation stage 31 arising from the increased range of magnetic field strength; the process interacting with the recovered process water in which the ground ore portion is contained.

In a preferred form, the magnetic field strength applied is at least 4500 Gauss. More preferably the magnetic field strength is at the range of 4500 to 10000 Gauss. More preferably, the magnetic field strength is in the range of 5000 to 10000 Gauss.

In a preferred embodiment, the present invention provides an apparatus 110 for inducing magnetism in a flow stream 112 of an at least partially magnetisable particulate feed material 114 suspended in a liquid. The feed material typically includes a mixture of paramagnetic and ferromagnetic particulates present with other nonmagnetic or diamagnetic gangue minerals in a water slurry. Paramagnetic particulates usually require a high gradient magnetic field in order to become magnetised. Some sulfide minerals containing copper (such as chalcopyrite), zinc (such as sphalerite contaminated with iron) or other transition metals are paramagnetic. Ferromagnetic particulates include iron oxide minerals (such as magnetite) and metallic iron particles (from worn grinding media, for example).

Referring to FIG. 8, the apparatus 110 includes a treatment chamber in the form of an annularly shaped vessel 116 with an uppermost inlet 118 and a lowermost outlet 120 through which a flow stream of the aforementioned mineral mixture can flow respectively into and out of the vessel 116 with some residence time therein. The apparatus can also be used in 'batch' mode, and does not require a continuous flow stream of the mineral slurry mixture. Furthermore, either the uppermost inlet 118 or the lowermost outlet 120 can be an inlet or outlet-which is to say flow can be reversed in the apparatus 110.

The chamber vessel incorporates a central elongate recess 122. A magnetic source is able to be selectively activated to induces magnetism in at least some of the particulate feed material 114 located in the vessel 116 by movement of the magnetic source into and out of proximity with the vessel 116. In one preferred embodiment the magnetic source is at least one permanent magnet mounted on a motive means in the form of a piston which is connected to a drive so that the piston can be reciprocatingly moved into and out of the recess 122. In one preferred embodiment the piston 124 is cylindrically shaped, having a diameter of approximately 300 millimetres and is fitted with a number of inset permanent magnets 126 that are square in shape and have a side dimension of 50 millimetres, made of neodymium or other materials. The diameter of the recess 122 in the vessel 116 is 800 millimetres.

In further embodiments the permanent magnets can be of any shape, size or material and the piston need not be cylindrical, but can be square or triangular in crossection for example, and of any overall length. The means by which the piston is moved reciprocatingly with respect to the vessel can include any type of drive including a cam, a spring, an air cylinder (128, as illustrated) or an occentrically rotatable shaft etc.

In still further embodiments the relative movement of the vessel and the magnetic source need not involve a piston being received into a recess in a vessel. The magnetic source need only be brought into proximity to the vessel, for example by being moved close to one side of a vessel so that a magnetic field can magnetise the particulate materials located in the vessel. In other embodiments the vessel itself may be able to be moved in relation to a stationary magnet. The vessel can be of any particular shape, size and orientation to facilitate the magnetic source coming into proximity to the vessel contents.

The apparatus 110 described allows the introduction of a high gradient magnetic. field to effectively magnetise both the weakly and strongly magnetic particulates 114 for subsequent removal of all particulates by enhanced gravity settling or separation of the weakly magnetic particulates by techniques such as flotation. When the piston 124 carrying the magnets 126 is moved into the recess 122 of the vessel 116, both the weakly and strongly magnetic particulates 114 are attracted and migrate toward the portion of the interior face of the vessel 116 which adjoins the internal elongate recess 122. The particles then become, at least in part, magnetised. When the piston 124 carrying the magnets 126 is moved out of the recess 122, deposits of magnetised particulate material 114 are no longer held to the interior face by magnetic attraction and are mostly dissipated by the flow stream 112 of feed material in the vessel 116. Depending on the location and orientation of the inlet and outlet ports, the vessel contents can develop a swirling fluid motion (illustrated in the drawing by an arrow in the vessel 116).

The dissipation of solids can reduce the possibility of any flow restrictions developing in the vessel and improve the efficiency of the magnet/s.

In still further embodiments a magnetic source can be selectively activated to induces magnetism in at least some of the particulate feed material located in the vessel by use of electromagnet/s located proximal to the vessel. The supply current fed to the electromagnet/s can be switched on and off repeatedly to provide the same effect as if a permanent magnet was moved in and out of proximity with the vessel. In still further embodiments the field of a permanent magnet can be shunted or blocked by moving a magnetic field barrier in between the permanent magnet and the vessel containing the magnetisable particulates.

The cycle or frequency of movement of the magnetic source may be initiated by a timing device or by sensors that detect the mass of accumulated particles 130. The measurement of this mass may be made by determining the interference to the magnetic field or by measuring the resistance to flow of the particulate slurry as the mass of particles 130 increases.

In the case of the paramagnetic feed material, the inventors have surprisingly discovered that the induced magnetism can cause at least some of the magnetised paramagnetic particles to become aggregated in the liquid flow stream. The inventors have observed that the aggregated paramagnetic particles remain aggregated for at least several hours and that the aggregated particles can survive further treatment steps in a mineral separation process such as pumping and agitation. In a feed with particulate materials of a range of magnetic susceptibilities, the preferred apparatus is able to be operated in a manner to facilitate the subsequent separation of the magnetised paramagnetic feed material fraction from the magnetised ferromagnetic feed material fraction. The magnetised paramagnetic feed fraction is also separable from the non-magnetic or diamagnetic gangue minerals.

In the experimental work, a flotation separation process was used on several finely ground mineral ores (typically with 80% of the ore particles of a particle size less than 100 micrometres in diameter) in order to separate the magnetised paramagnetic feed material into a froth phase.

The experimental results have demonstrated good increases in sulfide mineral recovery by flotation due to the use of the magnetisation treatment step prior to the flotation step. The inventors believe that the very fine (e.g. <10 micrometre diameter) paramagnetic particles, which ordinarily exhibit poor flotation rates and recoveries, once magnetised, can become aggregated to give an 'effective' (coagulated) particle diameter of greater than 10 micrometres. Such aggregates can exhibit good flotation rate and recovery characteristics due to hydrodynamic reasons such as better attachment to rising air bubbles in a flotation cell.

The use of sulfide mineral collector reagents such as xanthates or dithiophosphates can ensure that the surfaces of the paramagnetic mineral particles become hydrophobic and more readily attach to the surface of the rising air bubbles in the flotation cell. Typically the ferromagnetic particles in a particulate mixture of paramagnetic and ferromagnetic minerals are rejected in a flotation process (having no affinity for xanthate or dithiophosphate collectors) and report to gangue or tailings. In the experiments conducted, the sulfide mineral collector reagents used were present in the magnetisation treatment vessel 16 prior to any subsequent flotation step. In experiments where no magnetic treatment step was applied prior to the flotation step, the feed to flotation containing sulfide mineral collector was still passed through the vessel 16 prior to being passed to the subsequent flotation apparatus. The flotation apparatus used can comprise any standard type of agitated flotation cell, flotation column or flotation circuit.

As an example of the improvements that this apparatus and process have provided over that known in the prior art, experimental results produced using conventional froth flotation with and without the pretreatment step of the invention are now presented.

The present apparatus can allow the introduction of a very high gradient magnetic field to effectively magnetise the both weakly and strongly magnetic particulates. When the magnetic source is activated both the weakly and strongly magnetic particulates are attracted toward that magnetic source and become, at least in part, magnetised. Previous apparatus and methods have not allowed the use of very high gradient magnetic fields because of the problem of deposition of magnetised feed material around the magnetic source and the low degree of magnetisation of the weakly magnetic particulates.

The vessel and piston can be made of any suitable materials of construction which wear appropriately and that can be shaped, formed and fitted in the manners so described, such as a metal, metal alloy, hard plastics or ceramic.

It is to be understood that, if any prior art information is referred to herein, such reference does not constitute an admission that the information forms a part of the common general knowledge in the art, in Australia or any other country.

Whilst the invention has been described with reference to preferred embodiments it should be appreciated that the invention can be embodied in many other forms.

The above describes only some embodiments of the present invention and modifications obvious to those skilled in the art can be made thereto without departing from the scope and spirit of the invention.

INDUSTRIAL APPLICABILITY

Embodiments of the present invention are applicable in ore processing plants with a view to improving the proportion of fines recovery.

REFERENCES

1. Ahmed, N and Jameson, G, 1989. Flotation kinetics, *Mineral Processing and Extractive Metallurgy Review*, 50:77-99.
2. Engelhardt, D, Ellis, K and Lumsden, B, 2005. Improving fine sulphide mineral recovery-Plant evaluation of a new technology, in *Proceedings Centenary of Flotation Symposium*, pp 829-834 (The Australasian Institute of Mining and Metallurgy: Melbourne)
3. Holloway, B, Clarke, G, and Lumsden, B, 2008, Improving fine lead and Ag flotation recovery at BHP-Billiton's Cannington mine, Paper presented at the 40th Canadian Mineral Processors Conference, Ottawa, January 2008.
4. Lacouture, B, Wilson, B, Oliver, J, and Lumsden, B, 2016. Improving fine sulphideμ mineral recovery at the Red Dog operation, paper presented to XXVIII International Mineral Processing Congress (IMPC), Quebec City, September 11-15.
5. Musuku, B, Muzinda, I, and Lumsden, B, (2015). Cu—Ni processing improvements at First Quantum's Kevitsa mine, Min Eng, 88: pp 9-17.
6. Napier-Munn, T, 2010. Designing and analysing plant trials, in Flotation Plant Optimization: (ed: C Greet), pp 175-190 (The Australian Institute of Mining and Metallurgy: Melbourne).
7. Thompson, M, 2016. Concentrate Thickeners Feed Well Replacement, in Proceedings of the 13th Mill Operators' Conference, pp 273-278 (The Australasian Institute of Mining and Metallurgy: Melbourne).
8. Rivett, T, Wood, G and Lumsden, B, 2007. Improving fine Cu and gold flotation recovery—a plant evaluation, in Proceedings of the Ninth Mill Operators' Conference, pp 223-228 (The Australasian Institute of Mining and Metallurgy: Melbourne).
9. Svoboda, Jan, and Jan Ẑofka. "Magnetic flocculation in secondary minimum." Journal of Colloid and Interface Science 94.1 (1933): 37-44.
10. Wilding, J and Lumsden, B, 2011. Implementation of magnetic conditioning in two stage sequential Cu—Zn flotation separation, in Proceedings of the Conference of Metallurgists, pp 139-148 (Metallurgy and Materials Society: Quebec).
11. Zoetbrood, D, Vass, P and Lumsden, B, 2010. Magnetic conditioning of pentlandite flotation—plant evaluation, paper presented at Processing of Nickel Ores and Concentrates, Falmouth, June 2010.

The invention claimed is:

1. A method of increasing recovery of a metal portion from a predetermined quantity of ore in a flotation recovery circuit for recovery of a metal portion contained in ore; the circuit comprising a grinding stage, a flotation recovery stage, a dewatering stage and a filter stage and which effects the steps of:

grinding a predetermined quantity of ore in the grinding stage where it is ground to a predetermined size;

irrigating the ore with water, wherein at least a portion of the water includes recovered process water, thereby to form a ground ore portion;

applying a magnetic field to the ground ore portion in a magnetic conditioning stage forming a magnetically conditioned ground ore portion, wherein a strength of the magnetic field applied to the ground ore portion in the magnetic condition stage is at least 4500 Gauss;

conveying the magnetically conditioned ground ore portion to the flotation recovery stage;

applying flotation recovery via the flotation recovery stage to the magnetically conditioned ground ore portion thereby to extract a recovered metal portion from the magnetically conditioned ground ore portion;

dewatering the ground ore portion to extract the recovered process water having fine paramagnetic minerals; and returning at least a portion of the recovered process water with the fine paramagnetic minerals to the grinding stage after the dewatering stage for recovery of the fine minerals.

2. The method of claim 1 wherein the magnetic field strength applied to the ground ore portion in the magnetic conditioning stage is in the range of 4500 Gauss to 10000 Gauss.

3. The method of claim 1 wherein the magnetic field strength applied to the ground ore portion in the magnetic conditioning stage is in the range of 5000 Gauss to 10000 Gauss.

4. The method of claim 1 wherein the magnetic field strength applied to the ground ore portion in the magnetic conditioning stage is in the range of 6000 Gauss to 12000 Gauss.

5. The method of claim 1 wherein the at least a portion of the recovered process water returned to the grinding stage as output from a water-mineral separation process subsequent to the flotation stage.

6. The method of claim 5 wherein the dewatering step comprises filtration and/or thickening.

7. The method of claim 5 wherein the dewatering step is performed downstream of the flotation recovery stage and the magnetic conditioning stage.

8. A system for increasing recovery of a metal portion from a predetermined quantity of ore in a flotation recovery circuit which comprises a grinding stage, a flotation recovery stage and which effects the steps of a dewatering stage and a filter stage; the system includes the steps of grinding a predetermined quantity of ore to a predetermined size in a grinding stage while irrigating the ore with water including recovered process water thereby to form a ground ore portion;

conveying the ground ore portion mixed with the recovered process water to a flotation recovery stage;

recovering the recovered process water after the flotation recovery stage from the dewatering stage or the filter stage;

applying flotation recovery to the ground ore portion thereby to extract a recovered metal portion from a mix of the recovered process water and the ground ore portion;

returning at least a portion of the recovered process water containing fine paramagnetic minerals to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; the method improving recovery of desired paramagnetic minerals by aggregation of the para-magnetic minerals thereby to improve recovery of the fine paramagnetic minerals.

9. The system of claim 8 wherein the magnetic field strength applied to the ground ore portion in the magnetic conditioning stage is in the range of 4500 Gauss to 10000 Gauss.

10. The system of claim 8 wherein the magnetic field strength applied to the ground ore portion in the magnetic conditioning stage is in the range of 5000 Gauss to 10000 Gauss.

11. The system of claim 8 wherein the magnetic field strength applied to the ground ore portion in the magnetic conditioning stage is in the range of 6000 Gauss to 12000 Gauss.

12. The system of claim 8 wherein the at least a portion of the recovered process water containing fine paramagnetic minerals is returned to the grinding stage as output from a water-mineral separation process.

13. The system of claim 12 wherein the water-mineral separation process comprises filtration and/or thickening.

14. The system of claim 8 wherein the water-mineral separation process is located downstream of the flotation recovery stage and the magnetic conditioning stage.

15. An apparatus which increases recovery of the metal portion from a predetermined quantity of ore in a flotation recovery circuit which comprises a grinding stage, a flotation recovery stage and a dewatering stage and a filter stage; the circuit includes the steps of grinding a predetermined quantity of ore is ground to a predetermined size in the grinding stage while irrigating the ore with water including recovered process water thereby to form a ground ore portion;

conveying the ground ore portion mixed with the recovered process water to a flotation recovery stage;

the recovered process water recovered after the flotation recovery stage from the dewatering stage or the filter stage;

applying flotation recovery to the ground ore portion thereby to extract a recovered metal portion from a mix of the recovered process water and the ground ore portion;

returning at least a portion of the recovered process water containing fine paramagnetic minerals to the grinding stage;

a method of increasing recovery of the metal portion from the predetermined quantity of ore; said method comprising applying a magnetic field to the ground ore portion in a magnetic conditioning stage while it is contained in the recovered process water subsequent to the grinding stage and prior to the flotation recovery stage;

and wherein the magnetic field strength applied to the ground ore portion in the magnetic conditioning stage is at least 4500 Gauss; and thereby fine paramagnetic minerals in the recovered process water portion are recovered in the floatation stage.

16. The apparatus of claim 15 wherein the magnetic field strength applied to the ground ore portion in the magnetic conditioning stage is in the range of 4500 Gauss to 10000 Gauss.

17. The apparatus of claim 15 wherein the magnetic field strength applied to the ground ore portion in the magnetic conditioning stage is in the range of 5000 Gauss to 10000 Gauss.

18. The apparatus of claim 15 wherein the magnetic field strength applied to the ground ore portion in the magnetic conditioning stage is in the range of 6000 Gauss to 12000 Gauss.

19. The apparatus of claim 15 wherein the at least a portion of the recovered process water containing fine paramagnetic minerals is returned to the grinding stage as output from a water-mineral separation process.

20. The apparatus of claim 19 wherein the water-mineral separation process comprises filtration or thickening.

* * * * *